(12) United States Patent
Tuli

(10) Patent No.: US 9,277,060 B2
(45) Date of Patent: Mar. 1, 2016

(54) PRESENTING TO A USER CONTEXTUAL INFORMATION REGARDING A COMMUNICATION BEFORE THE USER TAKES ACTION CONCERNING THE COMMUNICATION

(75) Inventor: Apaar Tuli, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 1368 days.

(21) Appl. No.: 11/473,497

(22) Filed: Jun. 23, 2006

(65) Prior Publication Data

US 2007/0297582 A1    Dec. 27, 2007

(51) Int. Cl.
*H04M 1/64* (2006.01)
*H04M 15/00* (2006.01)

(52) U.S. Cl.
CPC ..................... *H04M 15/00* (2013.01)

(58) Field of Classification Search
USPC ............................................. 379/372–376.02
See application file for complete search history.

(56) References Cited

U.S. PATENT DOCUMENTS

| | | | | |
|---|---|---|---|---|
| 5,303,301 | A * | 4/1994 | Takahata | 379/142.06 |
| 5,999,611 | A * | 12/1999 | Tatchell et al. | 379/211.02 |
| 6,282,275 | B1 * | 8/2001 | Gurbani | H04M 1/57 379/142.06 |
| 6,681,004 | B2 * | 1/2004 | Strubbe et al. | 379/142.06 |
| 6,915,138 | B2 * | 7/2005 | Kraft | 455/466 |
| 6,977,993 | B2 * | 12/2005 | Starbuck et al. | 379/88.21 |
| 7,512,400 | B2 * | 3/2009 | Starbuck | H04M 1/2473 379/88.21 |
| 7,536,704 | B2 * | 5/2009 | Pierre et al. | 725/58 |
| 2002/0045466 | A1 * | 4/2002 | Teranishi | H04M 1/72519 455/567 |
| 2002/0136378 | A1 * | 9/2002 | Strubbe et al. | 379/142.01 |
| 2003/0148790 | A1 * | 8/2003 | Pappalardo et al. | 455/558 |
| 2004/0248560 | A1 * | 12/2004 | Bedingfield et al. | 455/412.2 |
| 2005/0058268 | A1 * | 3/2005 | Koch | 379/207.16 |
| 2005/0243979 | A1 * | 11/2005 | Starbuck et al. | 379/88.19 |
| 2006/0025112 | A1 * | 2/2006 | Hamanaga | H04M 1/56 455/412.1 |
| 2006/0056606 | A1 * | 3/2006 | Bocking et al. | 379/112.01 |
| 2007/0081641 | A1 * | 4/2007 | Veen et al. | 379/93.07 |

* cited by examiner

*Primary Examiner* — Duc Nguyen
*Assistant Examiner* — Assad Mohammed
(74) *Attorney, Agent, or Firm* — Harrington & Smith

(57) ABSTRACT

In one embodiment, a method including: receiving an incoming telephone call, which a user can choose to answer or leave unanswered; accessing one or more logs that associate data with identifiers to obtain log data associated with an identifier included in the incoming telephone call; creating a user alert for the incoming telephone call that includes displaying information based on the obtained log data; and updating the data associated with the included identifier in one or more logs.

21 Claims, 3 Drawing Sheets

PRESENTING TO A USER CONTEXTUAL INFORMATION REGARDING A COMMUNICATION BEFORE THE USER TAKES ACTION CONCERNING THE COMMUNICATION

FIELD OF THE INVENTION

Embodiments of the present invention relate to presenting to a user contextual information regarding a communication before the user takes action concerning the communication. In particular, they relate to the use of historic communications data to provide the contextual information.

BACKGROUND TO THE INVENTION

Caller Line Identification (CLI) helps the recipient of an incoming communication identify the originator of the communication before the communication is accepted.

An identifier of the originator of the originating terminal is sent from the originating terminal to the destination terminal. The destination terminal then displays the identifier or, if the identifier is associated with a name or alias in the terminal's phone book, displays the associated name or alias instead of the identifier. This latter feature makes CLI more user-friendly.

CLI is now a common feature in telecommunication networks. Mobile cellular telephone networks, the Plain Old Telephone System (POTS) and Voice over Internet Protocol (VoIP) terminal can all support CLI. It make be used with packet switched and also circuit switched communications.

Enterprise workers, especially those working in Sales, Marketing and other functions that might require a lot of one-time contact with individuals, often have to make and receive calls to phone numbers that are not already in the terminal's phonebook.

BRIEF DESCRIPTION OF THE INVENTION

It may be desirable to provide an improved telephone user experience especially for such enterprise workers.

According to one embodiment of the invention there is provided a method comprising: receiving an incoming telephone call, which a user can choose to answer or leave unanswered; accessing one or more logs that associate data with identifiers to obtain log data associated with an identifier included in the incoming telephone call; creating a user alert for the incoming telephone call that includes displaying information based on the obtained log data; and updating the data associated with the included identifier in one or more logs.

This embodiment of the invention provides an historic context for incoming telephone calls, so that the user in making a decision whether to answer the call or leave the call unanswered is more informed. For example, if there is a history of communicating with the originator of the incoming message or attempted communication between the originator and the user then the user is more likely to consider answering the call than if only the identifier is provided. Thus embodiments of the invention may provide an improved mechanism for screening telephone calls.

According to another embodiment of the invention there is provided a telephone comprising: receiver circuitry for a receiving an incoming telephone call, a user input device operable by a user to answer an incoming telephone call a memory for storing one or more logs that associate data with identifiers a display; and a processor operable to obtain an identifier from the incoming telephone call, to access the one or more logs to obtain log data associated with the obtained identifier, to control the output of a user alert for the incoming telephone call including controlling the display to display information based on the obtained log data; and updating the data associated with the included identifier in one or more logs.

According to another embodiment of the invention there is provided a physical entity embodying a computer program comprising instruction for: accessing one or more logs that associate historic communication data with identifiers to obtain log data associated with an identifier included in an incoming telephone call; and creating a user alert for the incoming telephone call that includes information based on the obtained log data.

According to another embodiment of the invention there is provided a method comprising: participating in a transfer of a message that includes identifier data; accessing historic communications data associated with the included identifier data; and presenting to the user information based on the accessed historic communications data and at least one user selectable option in relation to the message.

According to another embodiment of the invention there is provided a communication device comprising: transceiver circuitry for receiving or sending a communication, a user input device operable by a user to perform an action in relation to an incoming communication or an outgoing communication; a memory for storing one or more logs that associate communication data with identifiers; a display; and a processor operable to obtain an identifier from a communication, to access the one or more logs to obtain historic communication data associated with the obtained identifier, to display information based on the obtained historic communication data; and to update the communication data associated with the identifier in a one or more logs.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
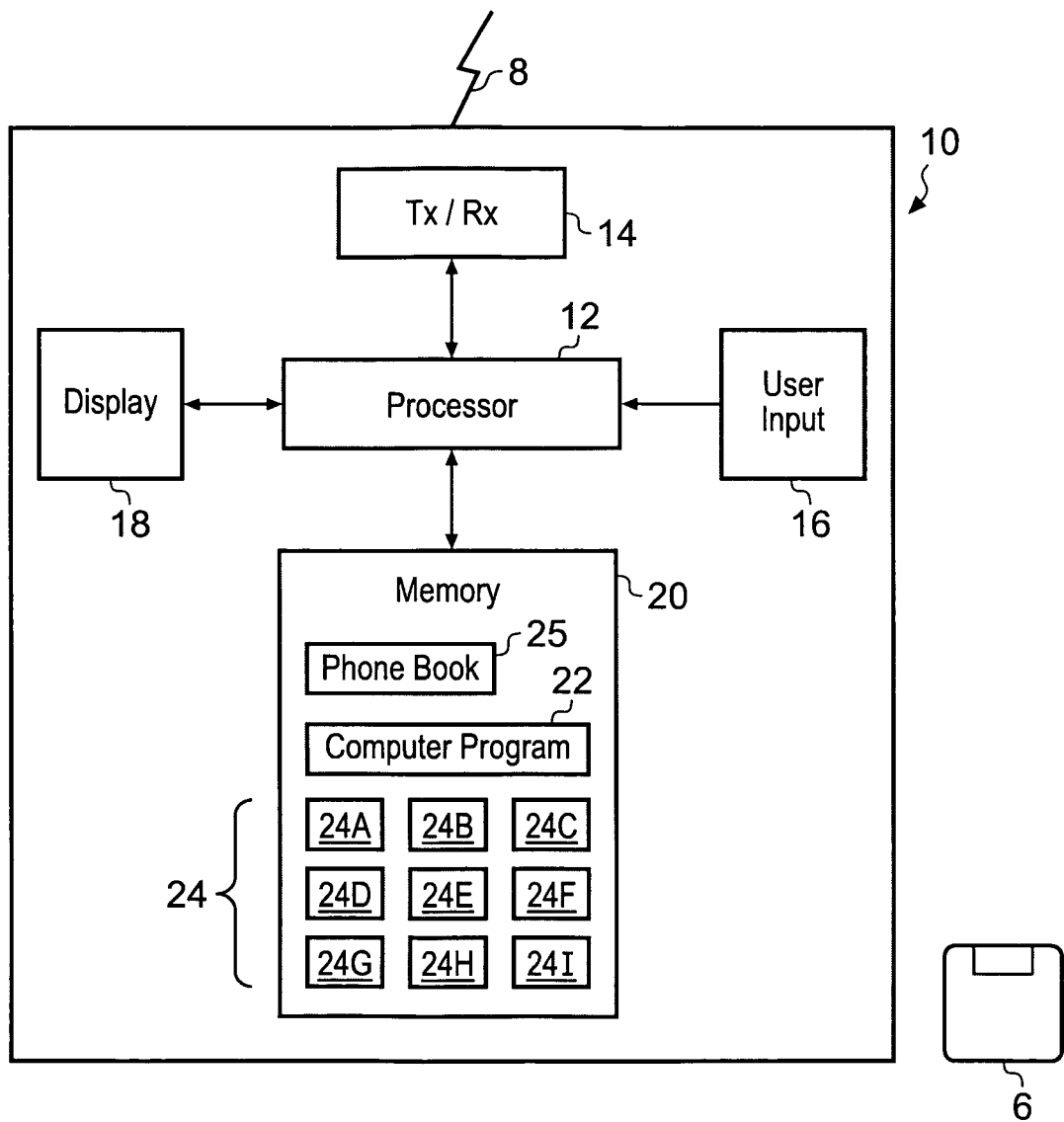
FIG. 1 schematically illustrates a communications device.

FIG. 1 schematically illustrates a mobile cellular telephone 10 comprising:

a processor 12; a cellular radio transceiver 14 that includes receiver circuitry for a receiving an incoming telephone call 8; a user input device 16 operable by a user to answer the incoming telephone call 8; a display 18 for displaying an incoming call alert to a user; and a memory 20.

Only as many components are illustrated as are referred to in the following description. It should be appreciated that additional or different components may be used in other embodiments of the invention. For example, although a programmable processor 12 is illustrated in FIG. 1 any appropriate controller may be used such as a dedicated processor e.g. an application specific integrated circuit or similar.

In the example illustrated, the memory 20 stores one or more logs 24 that associate data with identifiers. The memory 20 also stores a computer program 22 and a phonebook or contacts database that associates telephone numbers with descriptive character strings such as a persons name or alias.

The logs 24 provide a history of prior communications and attempted communications. Each log is a logically or physically separate data store associated with a different communication event type. A log 24 associates a record of events that involve an identifier for each of a plurality of identifiers.

Each time a particular communication event occurs, the event is analysed to determine if there is an identifier associated with the event, if there is the log 24 associated with the communication event type is accessed and a record is made for the identifier or the record for the identifier is augmented. The log will typically store for an event the time and date at which it occurred and, if appropriate, the duration of the event and/or other contextual information.

For example, an 'attempted calls' data store 24A may log as events telephone calls that are made by the user to identifiers that are unanswered. The 'attempted calls' data store 24A in this example records in association with an identifier the time (and date) values at which the calls were attempted.

For example, a 'successful calls' data store 24B may log as events telephone calls that are made by the user to identifiers that are answered. The 'successful calls' data store will record in association with an identifier the time (and date) values at which the calls were made and optionally the duration of the calls.

For example, a 'missed calls' data store 24C may log as events telephone calls that are made to the user that are unanswered. The 'missed calls' data store 24C will record in association with an identifier the time (and date) values at which the calls using that identifier were made.

For example, an 'answered calls' data store 24D may log as events calls that are made to the user that are answered. The 'answered calls' data store will record in association with an identifier the time (and date) values at which the calls were made using the identifier and optionally the duration of the call.

For example, a 'received message' data store 24E may log as events the reception of messages, such as SMS or MMS messages, that include identifiers. The 'received message' data store 24E will record in association with an identifier the time (and date) values at which the messages including that identifier were received.

For example, a 'sent message' data store 24F may log as events the transmission of messages, such as SMS or MMS messages, that are addressed to identifiers. The 'sent message' data store 24F will record in association with an identifier the time (and date) values at which the messages addressed to the identifier were sent. Alternatively or in addition, the 'sent message' data store 24F may log as an event the sending of a reply message to an message logged in the 'received message' data store 24E.

For example, a 'received email' data store 24G may log as events the reception of emails that include within the text of the email an identifier. An identifier may be recognised within the text of a received email by parsing the text and making a comparison with a filter that recognises an identifier format. The putative identifier may then be extracted. The 'received email' data store 24G will record in association with an identifier the time (and date) values at which the emails including the identifier were received and also optionally the subject of the email.

For example, a 'sent email' data store 24H may log as events the sending of emails that include within the text of the email an identifier. An identifier may be recognised within the text of a received email by parsing the text and making a comparison with a filter that recognises an identifier format.

The putative identifier may then be extracted. The 'sent email' data store 24H will record in association with an identifier the time (and date) values at which the emails were sent and also optionally the subject of the email. Alternatively or in addition, the 'sent email' data store 24H may log as an event the sending of a reply to an email logged in the 'received email' data store 24G.

For example, a 'calendar' data store 24I may log as events an appointment in a calendar that includes within the text of the appointment an identifier. An identifier may be recognised within the text of a received email by parsing the text and making a comparison with a filter that recognises an identifier format. The putative identifier may then be extracted. The 'calendar' data store 24I will record in association with an identifier the time (and date) values of the appointment including the identifier and also optionally the subject and location of the appointment.

The memory 20 stores computer program instructions 22 that control the operation of the communications device 10 when loaded into the processor 12. The computer program instructions 22 provide the logic and routines that enables the communications device to perform the methods illustrated in FIG. 2.

The computer program instructions may arrive at the communications device 10 via an electromagnetic carrier signal or be copied from a physical entity 6 such as a computer program product, a memory device or a record medium such as a CD-ROM or DVD.

The processor 12 operates to extract from an incoming paging message 8 an identifier such as a telephone number. It then accesses one or more logs 24 that contain historic communication data and obtains log data associated with the extracted identifier. The processor 12 uses the obtained log data to create an alert for the incoming telephone call 8. It controls the display 18 to present contextual information based on the obtained log data. Contextual data helps the user decide whether or not to accept the incoming call 8. The processor 12 then updates the logs 24 of historic communication data so that the incoming call 8 is recorded in one or more of the logs 24.

Although described in relation to a telephone and in particular a mobile cellular telephone, embodiments of the invention find application in any communication device in which, for example, when data is received, an alert is created to draw the user's attention to the possibility of performing an action. The contextual data provided by embodiments of the invention inform the user's decision whether or not to perform the action.

Figure 2:
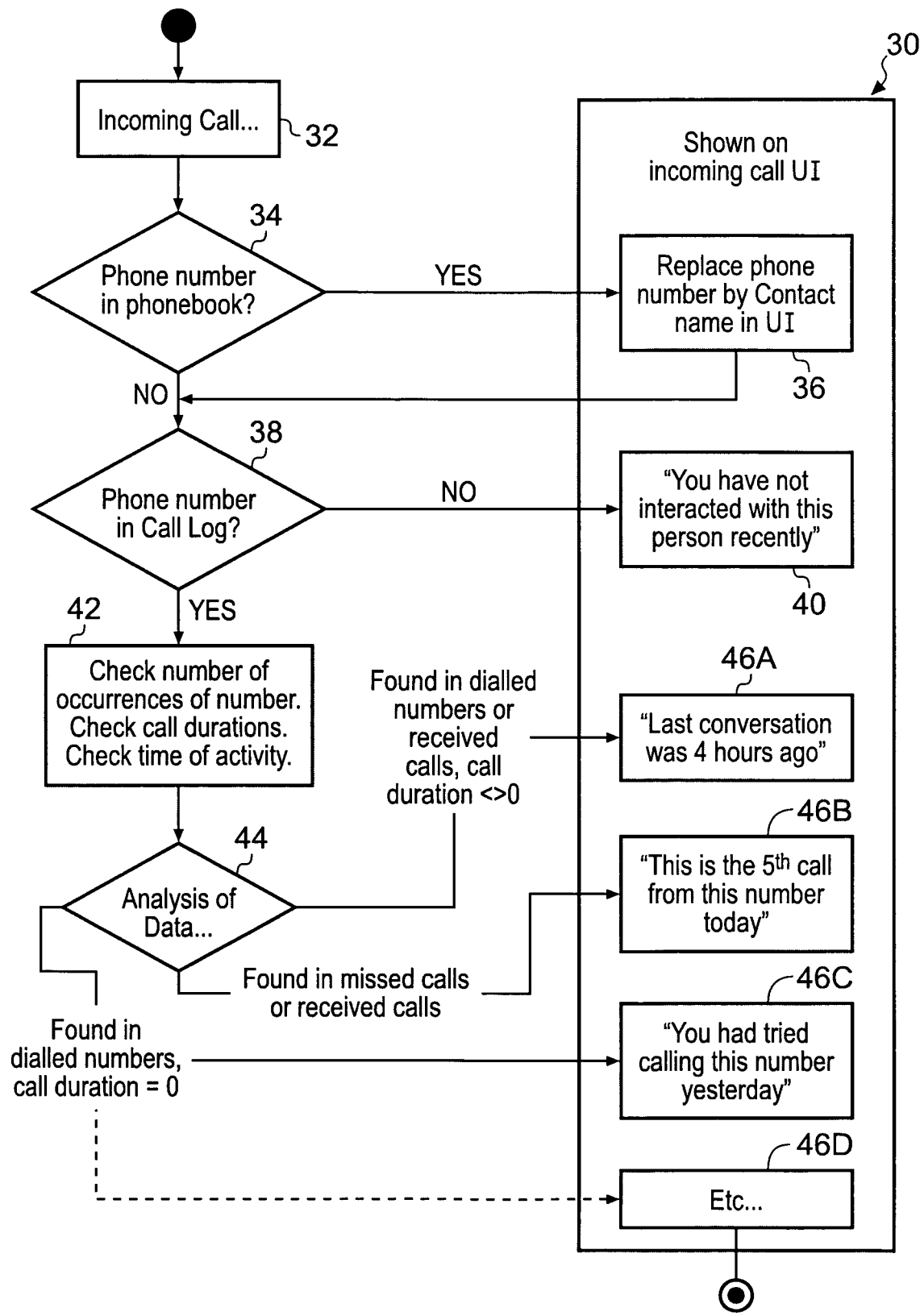
FIG. 2 schematically illustrates a method performed by the communications device.

FIG. 2 schematically illustrates the method 30 performed by the communications device 10.

At step 32, the device 10 receives an incoming telephone call 8, which a user can choose to answer or leave unanswered. The processor 12 extracts an identifier included within the incoming telephone call from the received data.

In the example of FIG. 1, the incoming telephone call 8 is a paging message for a telephone call that includes a call line identifier (CLID). The CLID is typically the telephone number of the telephone originating the telephone call and it is this that is extracted by the processor 12.

Next, at step 34, the processor 12 searches the phonebook 25 in the memory 20 to find an entry (if any) in the database that has a telephone number that matches the extracted identifier. If the search is successful, the method branches to step 36 and if the search is unsuccessful the method branches to step 38.

At step 36, an initial alert message 46 may be generated that includes a character string 50 (FIG. 3D) associated with the extracted identifier in the phonebook 25. The character string 50 is typically a user-friendly name or alias. After step 36, the process may either terminate or may move on to step 38 so that contextual communication data can be added to the generated alert message. A user may be able to configure the device to control whether or not step 38 is an available option.

At step 38, the processor searches the logs 24 in the memory 20 to find historic communications data associated with the extracted identifier. The logs, in combination, are a history of attempted and/or successful communications involving the device 10 or the user of the device 10. The search of the logs 24 themselves may be limited to a certain length of history such as a week.

If the search of the logs is unsuccessful, the method branches to step 40. At step 40, a final alert message is generated and displayed on the display 18. The final alert message will typically include either the extracted identifier or the character string extracted from the phonebook and also contextual information. In this case, the contextual information is null but optionally an additional message such as 'you have not communicated with this person recently' may be displayed.

If the search of the logs 24 is successful, the method moves to step 42 where the communication information obtained from the logs 24 is organised and verified.

Next at step 44, the obtained communication data is analysed to create user meaningful i.e. contextual user alert messages for display on the display 18 that include at least some of the organised, obtained historic communication data.

Examples of possible user alert messages 46 are illustrated in the Fig.

Figure 3A:
FIGS. 3A, 3B, 3C, 3D illustrate examples of alert messages displayable at the communications device.

The alert message 46A 'Last conversation was <X> days/hours/minutes ago', where one of 'days', 'hours' or 'minutes' is selected) is created if an entry for the extracted identifier is found in either the successful calls log 24B or the answered calls log 24D. The value of X is determined by subtracting the current real time clock value from the last value recorded in the found log entry and the result converted to a 'days', 'hours' or 'minutes' value. An example of the displayed alert message 46A is illustrated in FIG. 3A. A user selectable option 52 for answering the call is provided in this example. A user selectable option 54 for muting an audible alert is provided in this example.

Figure 3B:
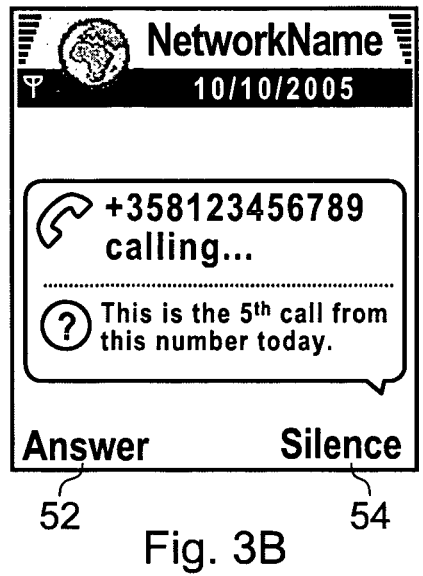

The alert message 46B 'This is the <Y> th call from this number today' is created if an entry for the extracted identifier is found in the missed calls log 24C or the answered calls log 24D. The value of Y is determined by counting the number of events recorded in each log, for the extracted identifier, that were recorded today. An example of the displayed alert message 46B is illustrated in FIG. 3B. A user selectable option 52 for answering the call and a user-selectable option 54 for muting an audible alert are also provided in this example.

An alternative alert message 'This is the <Z> th screened call from this number today' is created if an entry for the extracted identifier is found in the missed calls log 24C but no entry is found in the answered call log 24D. The value of Z is determined by counting the number of events recorded in the missed calls log 24C, for the extracted identifier, that were recorded today.

Figure 3C:
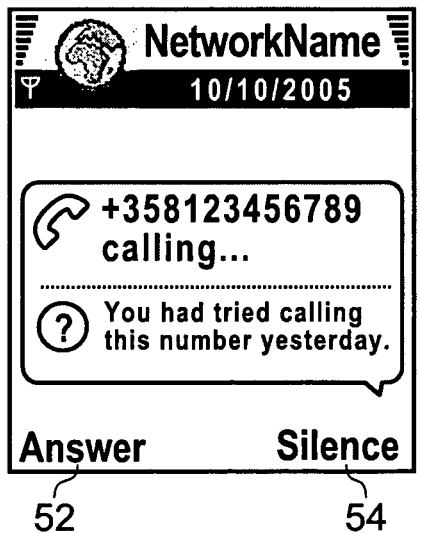
Figure 3D:
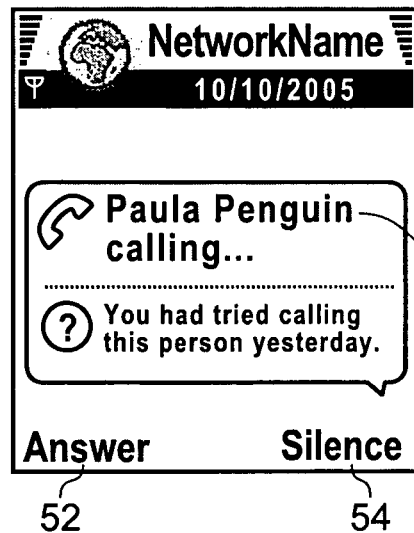

The alert message 46C 'You tried to reach this number <W>' is created if an entry for the extracted identifier is found in the attempted calls log 24A. The value of W is determined by identifying when the most recent event was recorded for the extracted identifier in the log. The value W may be given in a date formal dd/mm/yy or may be given in a colloquial format such as 'yesterday', 'the day before yesterday', 'a few days back', 'over a week ago'. An example of the displayed alert message 46C is illustrated in FIG. 3C, where the method 30 moved directly from step 34 to 38. An example of the displayed alert message 46C is illustrated in FIG. 3D, where the method 30 moved from step 34 to 38 via step 36. A user selectable option 52 for answering the call and a user selectable option 54 for muting an audible alert are also provided in this example.

It will of course be appreciated that the alert messages 46 illustrated are merely examples and other alert messages 46D are possible.

An alert message 46 may, for example, reference the last communication that is associated with the extracted identifier irrespective of the event i.e. phone call, message, email or appointment. An example is the alert message 46A. Other examples of suitable messages would be 'missed last call at <hh:mm> on <dd.mm.yy>', 'missed last call at <hh:mm> on <dd.mm.yy>', 'spoke at <hh:mm> on <dd.mm.yy>', 'received an email at <hh:mm> on <dd.mm.yy>', 'replied to an email at <hh:mm> on <dd.mm.yy>' etc.

There may be a preferential order to the events. For example, the alert message 46 may include the last phone contact in preference to other events even though it is not the most recent event associated with the extracted identifier. Such a preference may only exist if the phone contact event occurred within a certain time in the past. In this way each of the events may be assigned a level in a hierarchy of importance.

An alert message 46 may, for example, list the last communication events that are associated with the extracted identifier irrespective of the event i.e. phone call, message, email or appointment. The list may be ordered by event type importance.

An alert message 46 may, for example, summarize the last communication events that are associated with the extracted identifier. An example is the alert message 46B, the incoming call events are summarized. Other examples of messages are 'missed <X> calls in <Y> hours', 'spoken to <X> times in <Y> days', 'sent <X> emails in <Y> hours', 'received <X> emails in <Y> hours'

After the alert message 46 has been displayed, the processor 12 detects the event and updates the historic communication data by adding an event entry to the appropriate log 24.

If there is an 'unanswered call' event because the user does not answer the incoming call, the communication data associated with the extracted identifier in the missed calls log 24C is updated.

When a user answers a call using the user input 16, a response message is generated and transmitted by the transceiver 14 that establishes the telephone call. If there is an 'answered call' event because the user does answer the incoming call, the communication data associated with the extracted identifier in the answered calls log 24D is updated.

Although embodiments of the present invention have been described in the preceding paragraphs with reference to various examples, it should be appreciated that modifications to the examples given can be made without departing from the scope of the invention as claimed. For example, although the alert messages are presented on a display they may be presented in other formats. For example, the message may be presented as synthesized speech from an audio output device.

The embodiment of the invention described above relates to a terminal receiving a message. The invention may also be used if a device is used to create a message that includes the identifier as the destination address of the message. Such a message may be for initiating a telephone call or could be an MMS or SMS message, for example. In this example, the input of the identifier is automatically detected and the process steps 38, 42 and 44 of FIG. 2 are carried out. The user is then presented with contextual information about the input identifier. This will allow the user to easily refer to their last communication before the user selects the option to make the call or send the SMS/MMS message.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method comprising:
   receiving, at a communication device, an incoming telephone call, which a user can choose to answer or leave unanswered;
   accessing one or more logs that associate data with identifiers to obtain log data associated with an identifier included in the incoming telephone call;
   creating a user alert for the incoming telephone call that includes displaying, while receiving the incoming telephone call at the communication device, event information based on the obtained log data that informs the user of at least a first user preferred last event associated with the included identifier, wherein said first user preferred last event is associated with an event type, wherein said event type is associated with a user assigned level in a hierarchy of importance, wherein the displayed information includes a listing by event type of at least the first user preferred last event and a second user preferred last event associated with the included identifier, and wherein the display of said listing is ordered based on said hierarchy of importance; and
   updating, automatically without user input, by a processor of the communication device the data associated with the included identifier in one or more logs.

2. A method as claimed in claim 1, comprising updating the data associated with the included identifier in a first log if the incoming call is unanswered.

3. A method as claimed in claim 1, comprising updating the data associated with the included identifier in at least a second log if the incoming call is answered.

4. A method as claimed in claim 1, wherein the logs include one or more of the following logs: a log for calls made by the user, a log of incoming calls that were unanswered by the user and a log of incoming calls answered by the user.

5. A method as claimed in claim 1, wherein a log records, in association with an identifier, at least time information for an event involving that identifier.

6. A method as claimed in claim 5, wherein the time information is a real time clock value.

7. A method as claimed in claim 5, wherein the time information is a telephone call duration.

8. A method as claimed in claim 1, wherein an event associated with an identifier is an incoming call that includes the identifier and is unanswered, an incoming call that includes the identifier and is answered, an outgoing call that uses the identifier and is unanswered or an outgoing call that uses the identifier and is answered.

9. A method as claimed in claim 1, wherein an event associated with an identifier is call event or a messaging event.

10. A telephone comprising:
    receiver circuitry configured to receive an incoming telephone call,
    a user input configured to be operated by a user to answer an incoming telephone call,
    a memory configured to store one or more logs that associate data with identifiers,
    a display; and
    a processor configured to obtain an identifier from the incoming telephone call, to access the one or more logs to obtain log data associated with the obtained identifier, to control the output of a user alert for the incoming telephone call including controlling the display while receiving the incoming telephone call to display event information based on the obtained log data that informs the user of at least a first user preferred last event associated with the included identifier, wherein said first user preferred last event is associated with an event type, wherein said event type is associated with a user assigned level in a hierarchy of importance, wherein the displayed information includes a listing by event type of at least the first user preferred last event and a second user preferred last event associated with the included identifier, and wherein the display of said listing is ordered based on said hierarchy of importance; and
    to update, automatically without user input, the data associated with the included identifier in one or more logs.

11. A method comprising:
    participating, at a communication device, in a transfer of a message comprising at least text content that includes identifier data;
    accessing historic communications data associated with the included identifier data;
    presenting, while participating in the transfer of the message at the communication device, to the user event information based on the accessed historic communications data that informs the user of at least a first user preferred last event associated with the included identifier and at least one user selectable option in relation to the message, wherein said first user preferred last event is associated with an event type, wherein said event type is associated with a user assigned level in a hierarchy of importance, wherein the displayed information includes a listing by event type of at least the first user preferred last event and a second user preferred last event associated with the included identifier, and wherein the display of said listing is ordered based on said hierarchy of importance; and
    updating, automatically without user input, by a processor of the communication device the data associated with the included identifier in one or more logs.

12. A method as claimed in claim 11, wherein the method is performed at a destination of the message, the message requests a telephone call dialog and the user selectable option accepts the request for a telephone call dialog.

13. A method as claimed in claim 11, wherein the method is performed at a destination of the message, the message comprises content, and the user selectable option is opening or responding to the message.

14. A method as claimed in claim 11, wherein the method is performed at an origin of the message, the message is a message requesting a telephone call dialog and the user selectable option sends the message for creating an alert at the destination of the message, wherein user action is required to respond to the message at the destination.

15. A method as claimed in claim 11, wherein the method is performed at an origin of the message, the message comprises content and the user selectable option sends the message for creating an alert at the destination of the message, wherein user action is required to open the message at the destination.

16. A communication device comprising:
   transceiver circuitry configured to receive or send a communication,
   a user input configured to be operated by a user to perform an action in relation to an incoming communication or an outgoing communication;
   a memory configured to store one or more logs that associate communication data with identifiers;
   a display; and
   a processor configured to obtain an identifier from a communication, to access the one or more logs to obtain historic communication data associated with the obtained identifier, to control the display while receiving the communication to display event information based on the obtained historic communication data that informs the user of at least a first user preferred last event associated with the included identifier, wherein said first user preferred last event is associated with an event type, wherein said event type is associated with a user assigned level in a hierarchy of importance, wherein the displayed information includes a listing by even type of at least the first user preferred last event and a second user preferred last event associated with the included identifier, wherein the display of said listing is ordered based on said hierarchy of importance, and to update, automatically without user input, the communication data associated with the identifier in one or more logs.

17. A non-transitory computer-readable medium tangibly embodying a computer program, the computer program configured to control a processor and memory at least to perform:
   accessing one or more logs that associate historic communication data with identifiers to obtain log data associated with an identifier included in an incoming telephone call;
   creating a user alert for the incoming telephone call that includes event information based on the obtained log data that informs the user of at least a first user preferred last event associated with the included identifier, wherein the incoming call is received and the user alert is displayed while receiving the incoming call at a communication device, wherein said first user preferred last event is associated with an event type, wherein said event type is associated with a user assigned level in a hierarchy of importance, wherein the displayed information includes a listing by event type of at least the first user preferred last event and a second user preferred last event associated with the included identifier, and wherein the display of said listing is ordered based on said hierarchy of importance; and
   updating, automatically without user input, by a processor of the communication device the data associated with the included identifier in one or more logs.

18. A method as claimed in claim 1, wherein the displayed information includes a summary by event type of at least the first user preferred last event and a second user preferred last event associated with the included identifier, wherein the display of said summary is ordered based on said hierarchy of importance, and wherein at least one of the first user preferred last event and the second user preferred last event includes an event other than a telephone communication.

19. A telephone as in claim 10, wherein the displayed information includes a listing by event type of last events associated with the included identifier, wherein the display of said listing is ordered based on said hierarchy of importance.

20. A communication device as in claim 16, wherein the displayed information includes a listing by event type of last events associated with the included identifier, wherein the display of said listing is ordered based on said hierarchy of importance.

21. A method as claimed in claim 1, wherein the creating of the user alert further comprises creating a user alert for the incoming telephone call that includes displaying, while receiving the incoming telephone call at the communication device, information based on an attempted communication in the one or more logs, wherein the attempted communication was unanswered.

* * * * *

UNITED STATES PATENT AND TRADEMARK OFFICE
CERTIFICATE OF CORRECTION

| | | |
|---|---|---|
| PATENT NO. | : 9,277,060 B2 | Page 1 of 1 |
| APPLICATION NO. | : 11/473497 | |
| DATED | : March 1, 2016 | |
| INVENTOR(S) | : Tuli | |

It is certified that error appears in the above-identified patent and that said Letters Patent is hereby corrected as shown below:

Claims

Claim 16, col. 9, line 21 "even" should be deleted and --event-- should be inserted.

Signed and Sealed this
Seventeenth Day of May, 2016

Michelle K. Lee
*Director of the United States Patent and Trademark Office*